Feb. 25, 1964     B. EDWARDS     3,121,916
CONTAINER, AND METHOD AND MACHINERY FOR PRODUCING SAME
Original Filed Sept. 17, 1959     8 Sheets-Sheet 5

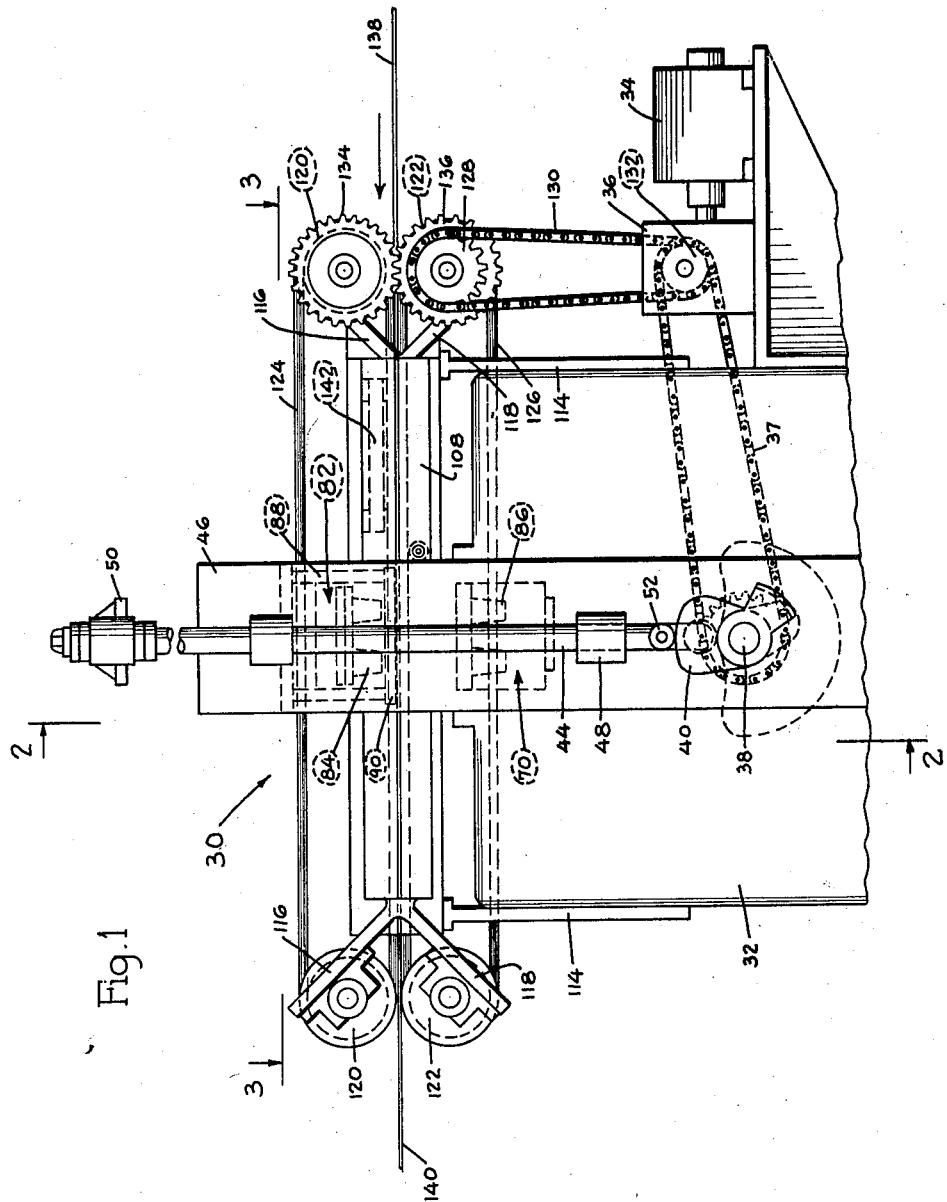

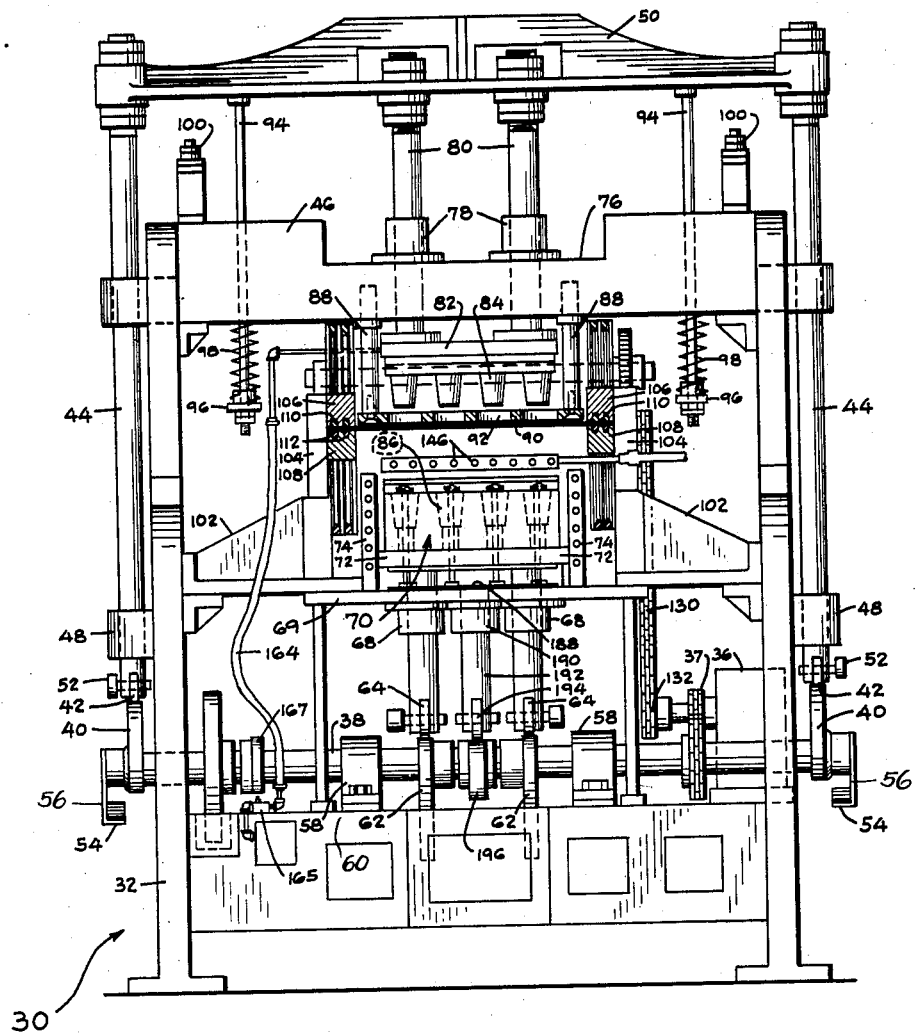

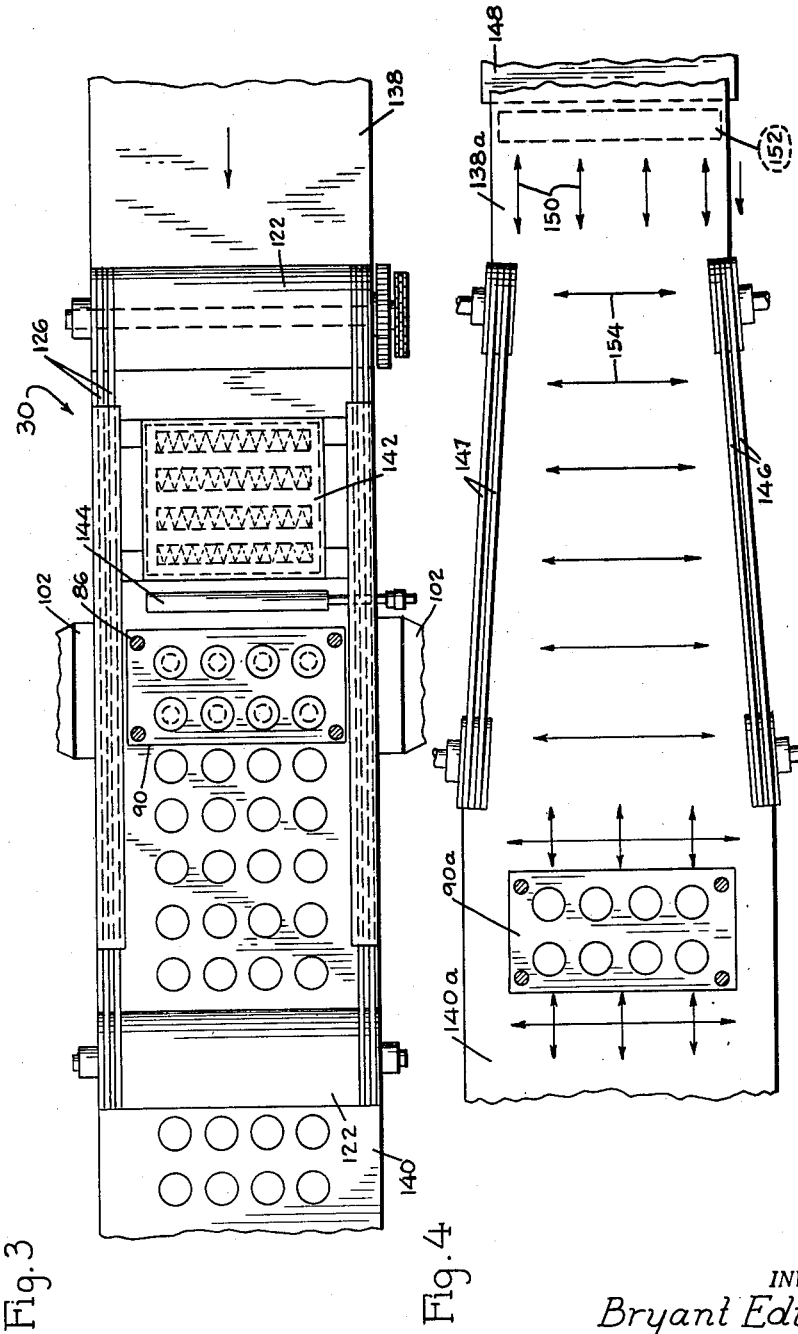

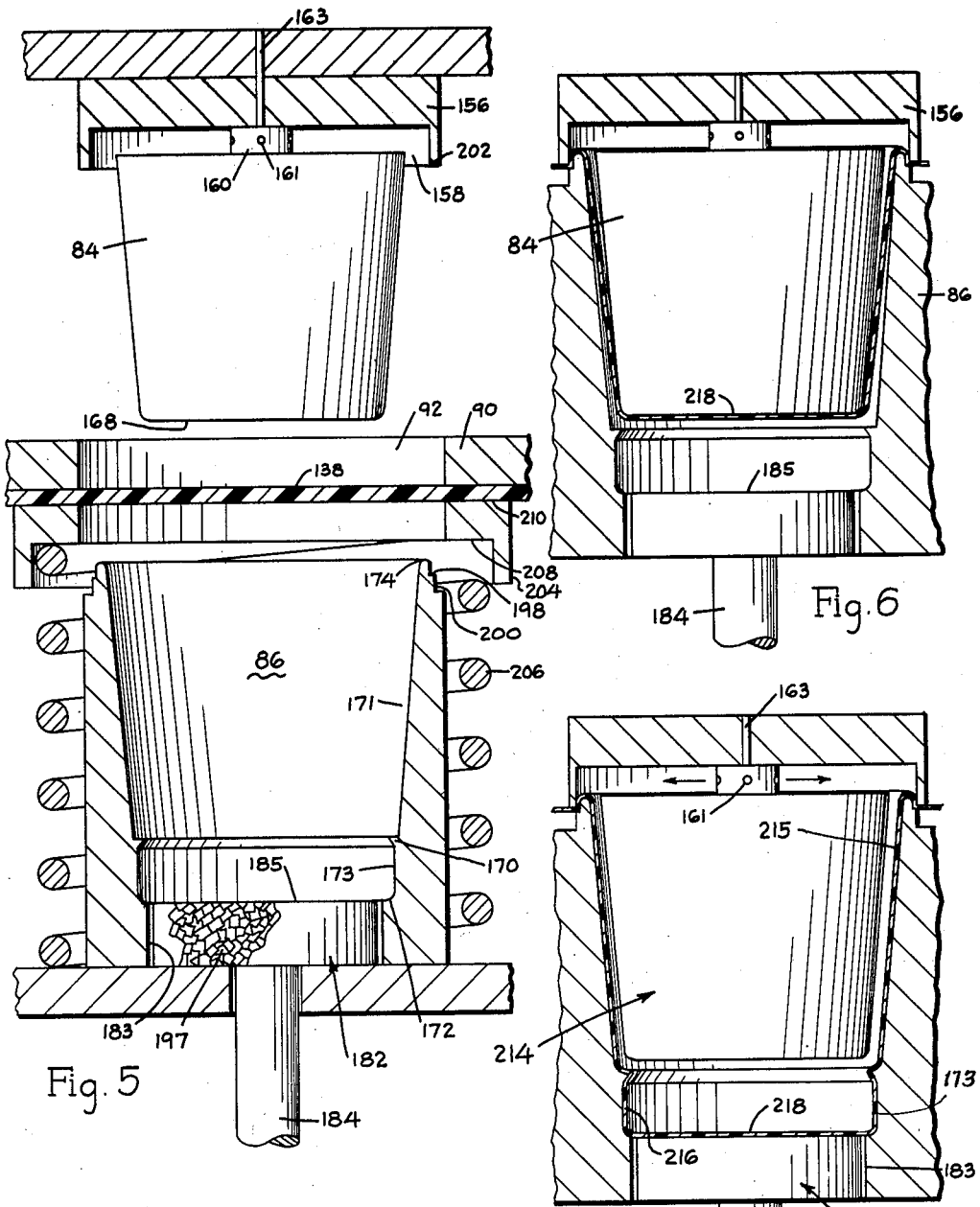

INVENTOR.
Bryant Edwards
BY
Robert A. Silver
atty.

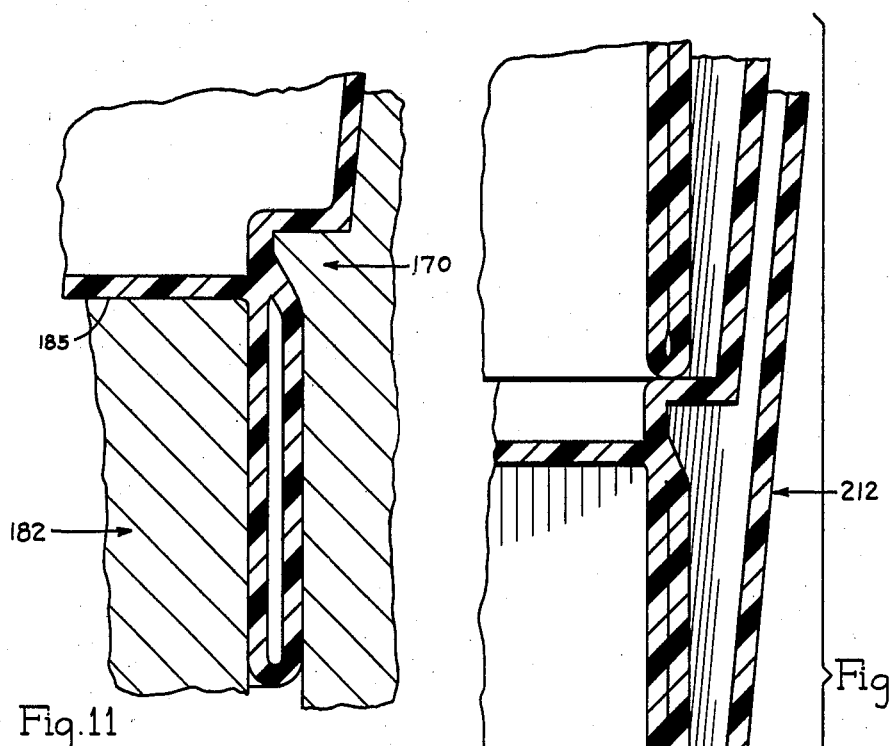
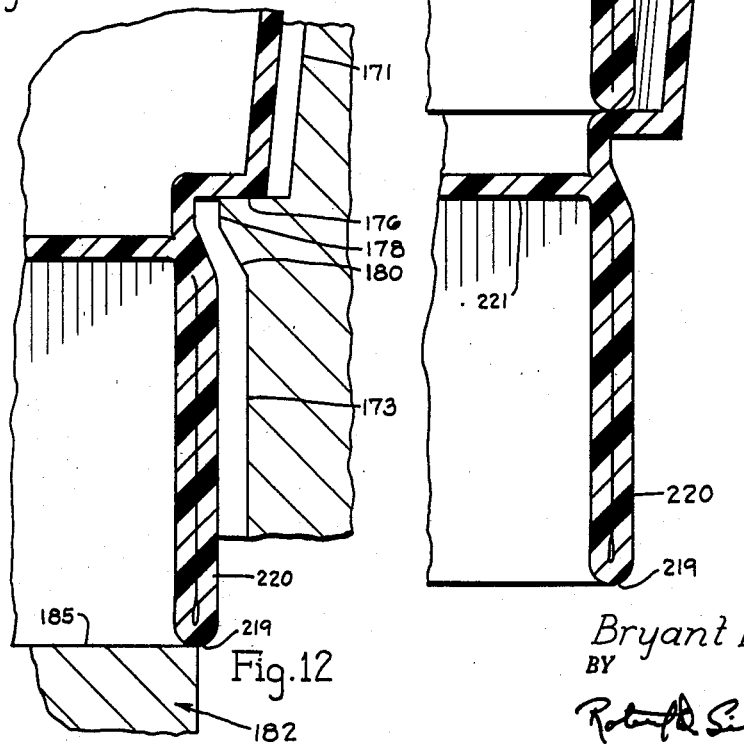

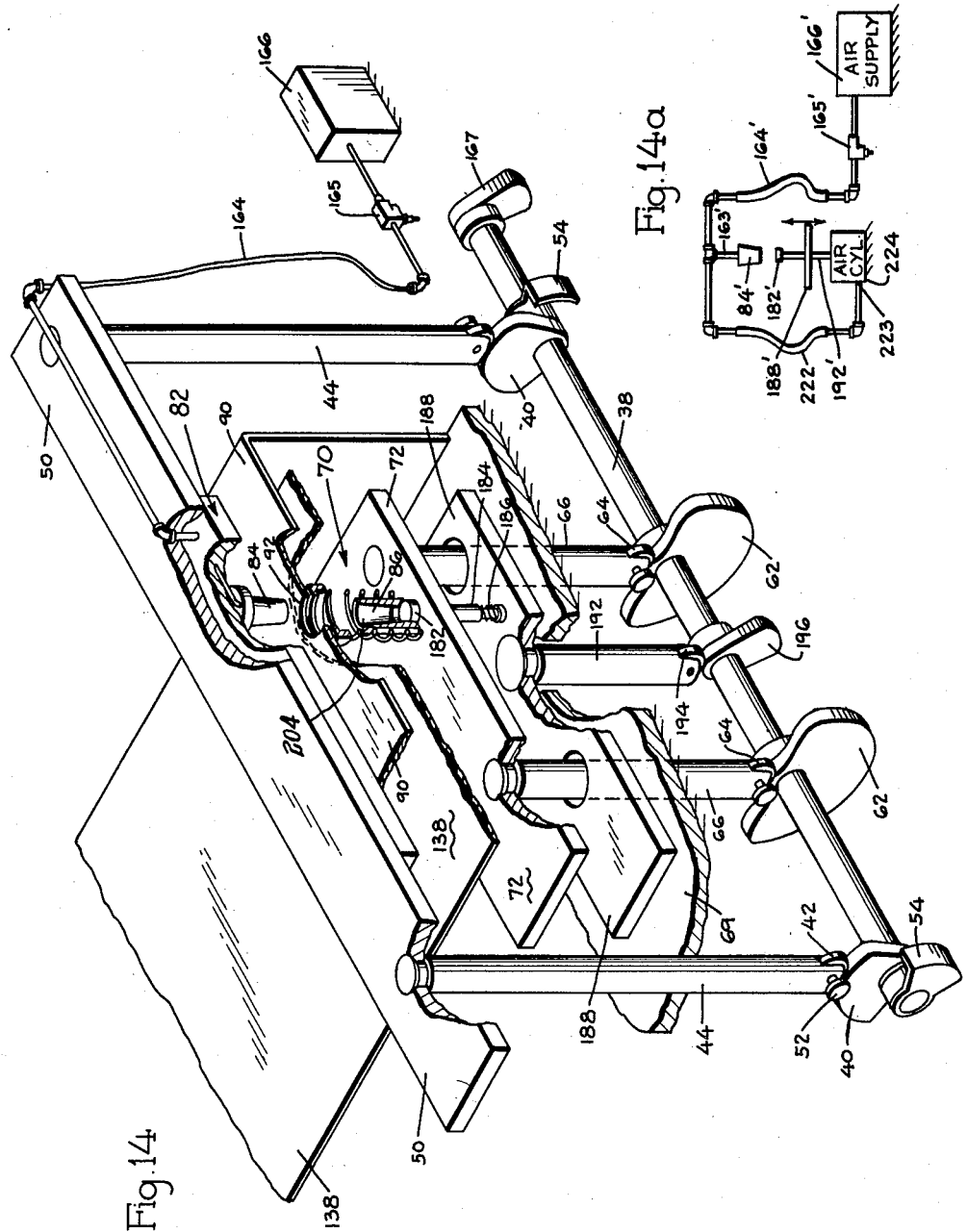

Feb. 25, 1964  B. EDWARDS  3,121,916
CONTAINER, AND METHOD AND MACHINERY FOR PRODUCING SAME
Original Filed Sept. 17, 1959  8 Sheets-Sheet 8

INVENTOR.
Bryant Edwards
BY
Robert Q. Silver atty.

United States Patent Office 3,121,916
Patented Feb. 25, 1964

3,121,916
CONTAINER, AND METHOD AND MACHINERY
FOR PRODUCING SAME
Bryant Edwards, Oak Park, Ill., assignor to Illinois Tool
Works Inc., Chicago, Ill., a corporation of Delaware
Original application Sept. 17, 1959, Ser. No. 840,604, now
Patent No. 3,059,810, dated Oct. 23, 1962. Divided
and this application Feb. 23, 1962, Ser. No. 175,258
15 Claims. (Cl. 18—19)

This invention relates in general to containers formed of plastic material and, more particularly, relates to thin wall plastic containers which are formed with a false bottom, that is to say, a bottom which is concaved axially upwardly a predetermined distance above the outer and visible side walls of a container.

There has existed a long-felt need for a thin walled plastic container having a false bottom. An advantage that accrues to a false bottom container, over a container having the bottom wall at the base of the side walls, relates to the stacking of a plurality of empty containers in telescoped relation in a manner to quickly facilitate easy removal thereof. The false bottoms, it will be apparent on reflection, space the individual containers one from the other in a manner not requiring auxiliary lugs or stacking rings which are often necessary on non-false bottom containers. The stacking feature is very important in containers to be associated with automatic equipment.

When thin wall plastic flush bottom containers are utilized with hot beverages, the heat from the beverage may damage surfaces upon which a flush bottom container is deposited. With a false bottom container, this situation is alleviated. In certain automatic vending machines dispensing hot beverages into containers, a false bottom container is found to be very useful in manual transportation of a filled container from the vending machine to the place of consumption. The construction of the false bottom container to be described in detail hereinafter is particularly advantageous in this regard due to the double thickness of the skirt portion defining the so-called false bottom.

A particularly important area of application of thin wall plastic containers of the "false bottom variety" is in the so-called "throw-away" or disposable container field. The particular problems involved relate to efficient manufacture of a container so as to be competitive with conventional containers while retaining the advantages that accrue to plastic materials. The articles to be later described in detail, that form a part of this invention, have the requisite strength, are easily formed in large numbers by mass manufacturing techniques, are aesthetically pleasing, and are otherwise well adapted for their intended purposes.

It has been found that one efficient manner of producing containers and the like involves their being molded from sheet thermoplastic material. This method contemplates warming the material, mechanically drawing it to a partially completed form, blowing air under pressure thereinto to form the material into the configuration of a cavity or mold and then immediately, while the formed plastic material is still in a heated pliable and plastic form, causing relative movement of certain parts of the plastic material in turn to cause a portion of the previously formed plastic material to adhere back upon itself to provide a novel false bottom container of superior characteristics. This invention relates to the novel container, improvements in a machine for producing superior false bottom container, and the novel methods of producing said container.

In my co-pending application entitled Container Molding Machine having Serial No. 763,668, filed on September 26, 1958, and now abandoned, I disclosed a machine wherein the plastic sheet is pre-stretched biaxially to accomplish molecular orientation in the sheet material, clamping or support means for holding a given area of the plastic material before and during the mechanical drawing of the material, and before any portion of the sheet material engages a complementary mold or die, improved mandrels or male die members which have controlled frictional and heat transfer characteristics, improved means for sealing off and shearing selected area of plastic sheet material all of which formed containers of improved uniform characteristics and of a superior finish.

I have elected to show a modification of the above-identified machine which will readily produce my novel false bottom containers. While I have elected to show a machine of the general characteristics of the aforementioned copending application, it will become obvious throughout the specification that there are other and different machines adaptable to producing my novel containers which may be used with equal facility as the instantly disclosed machine.

It is an object of this invention to provide a thin wall container with a novel false bottom feature having the characteristic of an annular depending side wall skirt portion, the cross-sectional thickness of the said depending skirt portion being substantially double the wall thickness of the remainder of the container.

It is still another object of this invention to disclose a method of taking a preformed container, and while it is still in a plastic stage and by means hereinafter disclosed, causing portions of the preformed container to be moved and thereafter to adhere to the adjoining container side wall thereby to provide the novel false bottom plastic container.

It is further, an object of this invention to provide an improved machine for practicing the methods by which the novel container may be formed.

The novel features that are characteristic to the invention are set forth with particularity in the appended claims. The invention itself, however, both as to its organization and its method of operation, together with additional objects and advantages thereof, will best be understood by the following description of the specific embodiments when read in connection with the accompanying drawings in which:

FIG. 1 is a side view of a machine constructed in accordance with the principles of this invention for making thin wall plastic containers having a false bottom;

FIG. 2 is a vertical cross-sectional view through the machine as taken along line 2—2 in FIG. 1;

FIG. 3 is a horizontal cross-sectional view through the machine as taken along line 3—3 of FIG. 1;

FIG. 4 is a view somewhat similar to FIG. 3 and showing a modification of the machine where the plastic sheet stock, or web is stretched biaxially;

FIG. 5 is an enlarged fragmentary vertical sectional view through the mold cavity showing the male member or mandrel before initial drawing of the sheet material as taken along line 5—5 of FIG. 2;

FIG. 6 is a view similar to FIG. 5 showing the relative relationship of the parts following the mechanical drawing of the web;

FIG. 7 is a fragmentary view similar to FIG. 6 showing a subsequent step in the operation;

FIG. 11 is an enlarged fragmentary sectional view of the lower right-hand corner of FIG. 8 of the drawings;

FIG. 12 is an enlarged fragmentary sectional view of the lower right-hand corner of FIG. 10 of the drawings;

FIG. 13 is a fragmentary sectional view showing the relationship of a plurality of false bottom containers when they are placed in stacked relation;

FIG. 14 is a semidiagrammatic isometric perspective view, with portions being broken away, illustrating the relative movement of the various parts of the machine to produce the false bottom container;

FIG. 14a is a semidiagrammatic view of an alternate method of accomplishing movement of the knockout plug relative to the female mold member during and after the formation of the false bottom container.

Figures 8, 9:
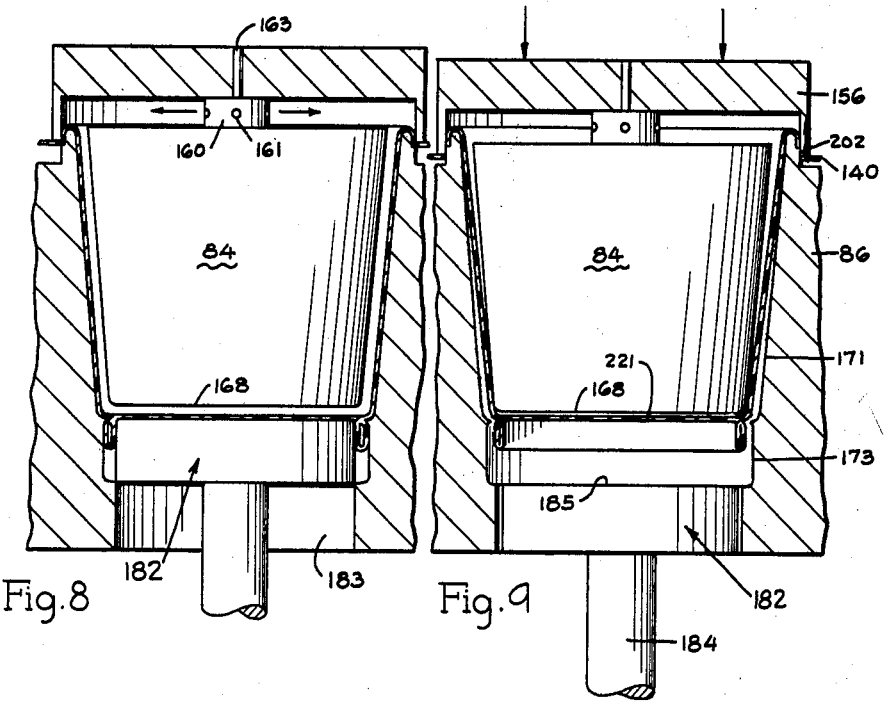
FIGS. 8 through 10 are views similar to FIG. 7 showing the next succeeding steps in the operation of the device.

In the art of forming containers and the like from plastic materials of the thermoplastic variety, two major methods have been used heretofore, namely, that of injection molding and the second type which may be designated as pressure molding. In the latter method a pressure differential is created across a web or membrane of thermoplastic material to cause it to move into engagement with a mold member. Methods to be discussed hereinafter in greater detail generally relate to the second type of molding process, but the preferred method employs a combination of use of pressure differentials along with a mechanical drawing of the sheet material to achieve the desired results.

While containers may be formed by a blow molding or vacuum molding process without any mechanical engagement of the web of heated thermoplastic material to form the container, I have found that more uniform results are obtained by mechanically drawing the heated thermoplastic material with a mandrel to cause the major deformation of the web or sheet stock, then clampingly engaging the drawn material around the periphery of a chilled mold member, and then introducing a fluid pressure differential (preferably air pressure differential) to the drawn web or film of material to cause it to separate from the mandrel and quickly engage the cooled mold cavity. I have found that if the bottom or end surface of the mold cavity is not chilled as is the rest of the cavity (and in some cases even is heated), then the complementary portion of the container which initially engages the bottom surface of the mold cavity may be displaced from this preformed stage and literally may be lifted or moved towards the open end of the container to a position it had assumed when the pressure differential was first created. When moving the bottom portion to its second position as just discussed, it is important to avoid stretching the material at the juncture of the side walls and bottom of the container as this would weaken the area substantially. I have found that by using the apparatus and methods which I am hereby disclosing the bottom-most portion of the side walls of the container adjacent the bottom of the container in the preformed stage may be folded back upon themselves, which folding affords several important results.

One of these results is to assure that there is no interruption in the container wall. This is exceedingly important for containers of the type which hold fluid beverages and the like. A second result of this folding back of the bottom-most portion of the side walls upon themselves is that a double-wall, strong, rigid skirt is provided which will support the container when filled. The skirt is a single continuation of the surface of the container which is never broken. The edge or bottom-most portion of the skirt represents the crease of the fold. It will be recognized that the foregoing is important since this double wall skirt must support the entire receptacle when filled and thus since many containers of plastic are thin walled (being measured in thousandths of an inch, i.e., .005 to .020), reinforcing by the supporting skirt portion is truly significant.

Another important feature contemplated by this method is that, as the double walls of the skirts are formed by being folded back upon themselves as previously described, the adjoining surfaces of the double walls are caused to adhere to each other. Assurance is thereby provided that the skirt portions will not be spaced apart and acting independently or separately. The adhering of the folded side walls to each other also allows the bottom wall to be integrally joined with the upper side walls of the cup for support thereby, as well as being supported from below by the depending double thickness skirt.

A further feature of the double thickened skirt at the bottom end of the container is that it serves, together with the normally folded over rolled lip at the open end of the container, as a convenient place for a person to support a very hot beverage since the thermo-conduction characteristic of the doubly thickened portion (i.e. the rim and the depending skirt) is less than that of the relatively thinner side portions and affords a person cooler places to carry and support such hot beverages. Another aspect of the sealed skirt portion is that it prevents the lodging of small food particles in the crevises and crannies that would appear in this area if it were not sealed. This is particularly important in re-usable containers that require cleaning.

Time, in my process, is a very important factor in accomplishing the moving of the bottom wall and a portion of the side walls from their preformed positions to their final positions. The time interval between the imposition of the pressure differential to the hot thermoplastic material to accomplish the initial performing, and the step of moving the bottom wall and a portion of the side walls to their final position must be exceedingly short.

To insure a good tight seal of the bottom wall portion of the container with the upper side walls of the container, after it has been raised from the preformed position, I have found that it is expeditious to form an annular inwardly directed shoulder in the mold which assures contact of the marginal edge of the bottom portion with the upper side wall portions to allow the material to reunite or flow together. Since the mold cavity surrounding this internal shoulder is cool, it is apparent that the movement of the bottom portion must be quickly accomplished in order to join the materials prior to setting thereof.

As will become apparent by the specific discussion of the methods and machine by which I provide this novel false bottom container, I have invented two major methods by which the bottom portion and bottom side wall parts of the preformed container may be moved from their preformed position to their final position. The first method is to do it mechanically with a heated (or at least relatively warm) movable end portion of the mold cavity, the movement of the end portion of the cavity being accomplished by a cam actuation off a drive shaft which has the advantage of being adjustable to accommodate a large number of different mold sizes and rapid stroke changes. An alternative to cam actuation is pneumatic actuation using the same air supply as disclosed herein for the initial preforming stage and by merely placing another outlet to the air supply at the pneumatic actuator downstream of the outlet which creates the pressure differential. The time differential necessary between preforming and moving the bottom portion of the mold cavity upwardly is afforded by the short time interval it takes the pressure front to traverse the distance between the upstream outlet and downstream outlet at the pneumatic actuator.

The second major method of forming the false bottom container is basically that of using the male mold member or mandrel which does the initial mechanical drawing as an abutment means in the third operation subsequent to the second operation which may be called the preforming stage. In the third operation, the mandrel is re-engaged with the web of material and serves as an abutment means stopping the bottom portions of the container in its finally formed position. The movement of the end portion of the preformed container from the second or preforming stage to the third and final stage being accomplished by reversing the pressure differential of the preformed stage so as to cause the bottom portions of the container to move in the reversed direction from the movement in the preforming stage for abutment against an internal shoulder of the mold and the end surface of the male mandrel.

While the foregoing has been discussed in quite general terms, it is believed that it will serve as an introduction to the understanding of the more detailed discussion that will now follow.

Referring now in greater particularity to the drawings, and first to FIGS. 1 to 3, there is shown a machine 30 for molding containers, such as false bottom cups, from plastic sheet material. While this specification will discuss this invention in terms of cups, the term should not be considered limiting as the invention has application to articles of many natures and uses. The machine includes a frame 32 having thereon a drive motor 34 driving a speed reducer 36. The speed reducer drives a chain 37 which in turn drives a shaft 38. The shaft 38 is provided at its opposite ends with cams 40 cooperable with cam followers or rollers 42 at the lower ends of push rods 44 journaled in a cross member 46 of the frame 32, and further guided by guides or sleeves 48 adjacent the lower ends of the push rod 44. The push rods 44 support at their upper ends a horizontal cross head 50. The push rods are provided with rollers 52 coaxial with the rollers 42 and these rollers 52 are positively forced down by the cam flanges 54 axially directed on arms 56 secured at the ends of the shaft 38 outwardly of the cams 40.

The shaft 38 is journaled in bearings 58 supported from a transverse portion 80 of the frame, the bearings being spaced in from the ends of the shaft. Between these bearings and adjacent thereto the shaft is provided with a pair of cams 62 cooperable with cam followers 64 at the lower ends of push rods 66 journaled in bushings or the like 68 mounted on a fixed central plate portion 69 of the frame. A mold 70, having a plurality of cavities therein, and subsequently to be discussed in greater detail, is supported at the tops of the push rods 66 for vertical movement as controlled by the cams 62. The mold or die 70 is provided with lateral base extension 72 cooperable with a fixed member 74 on the frame portion 69 to the guide the mold means or die 70 in vertical movement.

The transverse frame member 46 is provided with a depressed central section 76 having a pair of bushings 78 mounted thereon. Posts or connecting rods 80 extend vertically through these bushings and through aligned apertures in the depressed central section 76 of transverse frame member 46. The connecting rods or posts 80 are fixed at their upper ends to cross head 50 and move vertically therewith. The connection is a screw set arrangement, as will be seen particularly in FIG. 2 and this allows for a certain amount of vertical adjustment. Molding head 82 is secured to the bottom of the posts or connecting rods 80 and includes a plurality of downwardly directed mandrels or male die members 84 aligned with corresponding cavities 86 in the mold 70. In the specific illustrative embodiment, there are two rows of four mandrels or eight mandrels in all. This is, of course, semidiagrammatic and not intended to be limiting.

Four posts 88 depend from the depressed central section 76 of transverse frame member 46 adjacent the corners of the molding head 82, but spaced outwardly therefrom, in support of fixed clamping plate 90. This plate is provided with a plurality of apertures 92 respectively aligned with the mandrels 84 and through which the mandrels extend in a molding operation, as hereinafter will be set forth. The plate further cooperates with portions of the mold 70 to secure a plastic sheet for molding, as will be set forth hereinafter.

A pair of rods 94 is mounted on the cross head 50 relatively adjacent the opposite ends thereof. The rods extend through suitable holes in the transverse frame member 46, and are provided at their lower ends with adjustable stops or spring anchors 96 conveniently comprising nuts and washers. A helical spring 98 encircles each rod and is compressed between the transverse frame member 46 and the corresponding stop or spring anchor or seat 96. Accordingly the cross head 50 and the push rods 44 are urged resiliently down, whereby to hold the followers 42 resiliently against cam 40. The transverse frame member 46 also is provided with adjustably fixed stops 100 adjacent its opposite ends and engageable with the cross head 50 to limit downward movement thereof.

The fixed frame parts supporting the fixed plate 69 and mold guide 74, such frame part hereinafter being identified by the numeral 102, are provided at their upper edges with upstanding supports 104 which support upper belt guides 106 and lower belt guides 108. The guides 106 and 108 are spaced apart only a short distance, and are provided with pairs of confronting grooves 110 and 112 respectively.

The guides 106 and 108 further are supported at their ends by supports 114 (see FIG. 1) upstanding from the frame. The ends of the guides are provided with oppositely extending and diverging supports comprising upper supports 116 and lower supports 118 and are provided with journals rotatably mounting a pair of spaced upper rollers 120 and a corresponding pair of spaced lower rollers 122. Each roller is provided with four V-grooves, one pair near each end, receiving two pairs of upper V-belts 124 and two pairs of lower V-belts 126.

The lower roller 122 at the entering end of the machine (the right end as viewed in FIGS. 1 and 3) is provided with a sprocket 128 driven by chain 130 from a sprocket 132, the latter being intermittently driven by suitable mechanism incorporated in the speed reducer 36. Intermittent motion mechanisms are well known in the art, and any suitable type may be used. Further, the entering end rollers 120 and 122 are geared together by suitable meshing gears 134 and 136, whereby the belts 124 and 126 are driven intermittently and in synchronism. A web or film 138 of plastic sheet material stock is fed into the machine through the rollers 120 and 122 at the entering end of the machine, is carried by the belts 124 and 126 past the molding head 82 and mold 70 and emerges from the machine through the discharge rollers 120 and 122 as scrap 140. Plastic sheet material preferably is of the thermoplastic variety, and polystyrene, for example, has been used with success. The sheet material may be fed from a suitable storage roll or directly from an extruder which makes such forms of sheet material.

In order to insure proper plasticity of the sheet stock, there may be provided an electric resistance heater 142 (or other suitable type such as infra-red heaters) suitably supported above the web 138 between the entering end of the machine and the mold and molding head. This heater conveniently may be supported from a fixed portion of the machine such as the belt guide 108.

In addition to the foregoing, there is provided immediately adjacent the entering end of the mold and molding head, an air pipe 144 connected to a suitable source (not shown) and having jets in the side thereof at 146 directing air under pressure to blow finished containers away from the mold and onto a conveyor or other suitable means to carry the products away.

It has been found that the containers produced by the above machines are stronger if the plastic sheet material from which they are made is initially stretched biaxially. Therefore, modification of the machine to accomplish this is shown in FIG. 4. The plastic sheet material is gripped along its opposite edges by diverging pairs of belts (which accomplish the desired transverse stretching) 147 in FIG. 4.

It will be understood that there are a pair of belts above the plastic sheet material along each edge and also a pair of belts below the plastic sheet material along each edge, and aligned with the upper belts. The belts are preferably backed up by suitable rollers or guide means to maintain sufficient clamping pressure on the edges of the material.

Means is provided for restraining or holding back the sheet material, and it is illustrated as being a roller 148. The surface speed of the roller is less than the speed of the belts 147, and hence the belts cause the material to be stretched longitudinally as indicated by the arrows 150. According to one form of the invention, the plastic material is fed directly from the extruder and hence is still warm and pliable. However, in some instances, whether from an extruder or from a storage roll, the plastic may have to be heated to a certain extent, and heating means such as electric heaters or infra-red heaters are provided as necessary. One such heater is indicated at 152.

Subsequent treatment of the plastic sheet material, as to the molding of the articles is similar to that previously alluded to, and hereinafter described in greater detail. Further reference to this point is believed unnecessary, in view of the use of similar reference numerals to those previously used with the addition of the suffix (a). As will be noted adjacent the left-hand portion of FIG. 4, the material has been stretched biaxially as indicated by the horizontal number of arrows.

Referring now to FIG. 5, the molding head 82 may be designated as a combination clamping, cut-off and mandrel means, and comprises a mounting plate 156 having an annular ring recess 158 in the vicinity of the mandrel 84 illustrated. In recess 158 is a central depending boss 160 which supports the mandrel 84 and is provided with a plurality of apertures 161 which are connected to an air inlet pipe 163.

It will be appreciated, that a manifold or the like is provided to provide air under pressure concurrently to all of the inlet pipes 163, there being one such inlet for each mandrel 84. Air is supplied from any suitable compressor or the like 166 (shown schematically in FIG. 14) to flexible hoses 164 (see FIGS. 2 and 14) through the use of a suitable valving means 165 or any other commerically known satisfactory expedients. The valve means 165 may be actuated by cam 167 mounted on shaft 38. (It will be appreciated that the disposition of cam 167 and valve 165, as shown in FIG. 14, is to be considered semidiagrammatic).

The mandrels 84 as shown are substantially in the shape of the frustrum of a cone and are provided with substantially flat bottom surfaces 168. The mandrels 84 are preferably heated by suitable means (not shown) for the reasons hereinafter set forth. As set forth in my aforementioned application, the outlets 161 may be in the mandrel 84 per se if desired.

It has been found that one essential feature of a mandrel 84 is that it does not extract any substantial amount of heat from the material being molded. It will be appreciated that if heat is extracted from the previously heated plastic sheet material during the molding operation, the sheet loses its elasticity and resists further forming or deformation. A predetermined degree of cooling of the material upon contact with the mandrel is desirable to prevent unwanted sliding of the material over the entering end of the mandrel; it is imperative that the sheet is not substantially chilled by the mandrel. Another essential is that the sheet material must not slide in an uncontrolled manner over the bottom end of the mandrel. Such sliding results in thinning of the sheet material in the vicinity of the bottom of the mandrel, with a resulting thin bottom for the cup or other container.

The mandrels 84 may be made of wood, plastic or metal. In order to avoid extraction of heat from the sheet plastic material by the mandrel, there may be provided a heater within the mandrel which may be an electric heater having lead wires of suitable types. It should be emphasized that the mandrel does not heat the sheet material which in the case of polystyrene has been found to mold satisfactorily at a temperature of 240–260° F. Metal mandrels, such as aluminum or steel, have been found to operate substantially satisfactorily if operated at a temperature of 125° F. or 250° F. There is no known explanation at the present time as to why two such widely separated temperatures operate satisfactorily, however, actual tests show that this is a fact. Structure or means by which anti-skid or anti-slipping qualities are imparted to the entering end of the mandrel will not be discussed as they are set forth in more detail in my co-pending United States application, Serial No. 763,668.

Cavity 86 of the die or mold means 70 is aligned with a corresponding mandrel 84. The upper portion of the cavity is provided with a generally frusto-conical shape generally complementary to the mandrel. Adjacent the bottom of the cavity 86 and complementary to the extended position of the mandrel 84, with a mandrel and cavity 86 in telescoped relation, the side wall of the cavity is formed with an inwardly directed shoulder means 170 (best shown in FIGS. 11–12) to provide a shelf for reasons that are deemed important and will become apparent.

The shoulder means 170 (best shown in FIGS. 11 and 12) is positioned on the side walls of the cavity 86 in a manner to define a relatively large upper portion 171 which has tapering side walls and a relatively straight or vertical short second side wall portion 173. The upper extremity of the side walls 171 is defined by the lip or shoulder portion 174 and the shoulder means 170 and the second or lower portion 173 is defined by the inwardly curved bottom end portion 172 and the shoulder means 170. More specifically, the shoulder means 170 per se includes a first horizontal portion 176, a relatively short vertical portion 178 and a reversed beveled portion 180. (While these enlargements as shown are considerably greater than actual size, they are fairly accurate in terms of proportion.)

As best shown in FIG. 7 of the drawings, the side wall of portion 173 is preferably vertical or parallel with the axis of the mold cavity and the diameter of the side wall 173 preferably is slightly greater than the diameter of vertical portion 178 of the shoulder means 170. Further, the second portion 173 of the side wall is preferably slightly less in diameter than the diameter of the side wall of the first portion 171 at the smallest point, i.e. immediately adjacent the shoulder 170.

A relatively movable mold element 182 (FIGS. 5–7) located in the base of the mold cavity performs a triple function in the manufacturing process. First it serves as the bottom wall of the mold 86. Further, it mechanically moves the bottom portion of a preformed container to its spaced final position. Lastly, it serves as a knock-out plug to remove the completely formed container from the mold cavity as will be hereinafter explained. As shown, the knock-out plug or mold element 182 is cylindrical in shape and is normally positioned in a bore 183 of the mold cavity 86 so that top surface 185 is flush with end surface 172 of the cavity. The plug 182 is mounted for relative movement relative to the mold cavity 86 in two distinct ways. First it is mounted on a suitable stem 184 for movement therewith. A lost motion spring 186 may be placed adjacent the lower end of the stem 184 to cooperate with a bushing (not shown) constantly to bias the stem 184 in a downward position as indicated in schematic FIG. 14. The stem 184 and knock-out and forming plug 182 are mounted for relative movement to the fixed portion of the frame 69 by means of a movable plate 188 which is shown most clearly in schematic diagram FIG. 14. The plate 188 bottoms on fixed frame portion 69 and is movable upwardly therefrom by an actuating post 192 which is mounted in a suitable bushing 190 (shown in FIG. 20). The actuating post 192 has a cam follower 194 mounted at the bottom end thereof which is engaged by a cam 196 which is mounted on shaft 38. As can be seen quite clearly in FIG. 14, rotation of shaft 38 will cause cam 196 to engage roller 194 to in turn lift actuating post 192 to in turn cause upward movement of plate 188 which in turn causes a relative movement of the knock-out and forming plug 182 relative to the mold cavity 86, the latter being mounted on separate cam actuated posts 66.

The second relative movement of the plug 182 to the cavity 86 is obtained when plate 188 is bottomed on frame 69 and the cavity 86 is moved downwardly to cause ejection of the container as will be explained. The relative sequence of this operation together with other operations of the device will become more apparent during the discussion of the operation of the machine.

The knock-out and forming plug 182 is preferably formed of a porous sintered material 197 which permits equalization of fluid pressure on both sides of the plug 182. The same result may, of course, be accomplished by making the element 182 of solid material but providing it with a central insert of permeable material, i.e. which affords a passageway for equalizing pressure differentials for the purposes as will be later explained.

As clearly shown in FIG. 5 the upper portion 174 of the mold 86 is rounded at the top end thereof and on the outside of the entering end is a short shoulder 198 which adjoins a relatively vertical annular surface 200. This portion of the mold together with clamping and cutoff edge 202 of the recess 158 of the mandrel means 84 serves to clampingly engage the membrane of plastic material after it has been mechanically pre-drawn by the mandrel portion 84. (This is in accordance with the teachings of my co-pending application 763,668 aforementioned.)

To clamp the web of plastic material 138 for the mechanical drawing thereof by the mandrel 84, an annular ring-like clamping means 204 cooperates with clamping plate 90 to engage the web of material just prior to and during the mechanical drawing operation. The lower clamping means 204 cooperates with clamping plate 90 to engage the web of material just prior to and during the mechanical drawing operation. The lower clamping means 204 is provided with an annular recess 208 which receives a helical spring 206 to resiliently urge surface 210 of the clamping ring 204 into engagement with the thermoplastic material.

Before discussing the sequential operation of the machine, it will perhaps be helpful to identify certain portions of the container in its preformed state and in its finished state. The completely formed container will be identified with the reference numeral 212 and the preformed or intermediate stage container will be identified by the reference numeral 214 as shown most clearly in FIG. 7 of the drawings. The preformed container 214 has an upper portion 215 and a lower side wall portion 216 which together provide the side walls of the preformed container which is of complementary shape to the mold when the plug 182 is in the position shown in FIG. 7 of the drawings. The bottom surface of the preformed container 218 is immediately adjacent the top surface of the plug 182.

Figure 10:
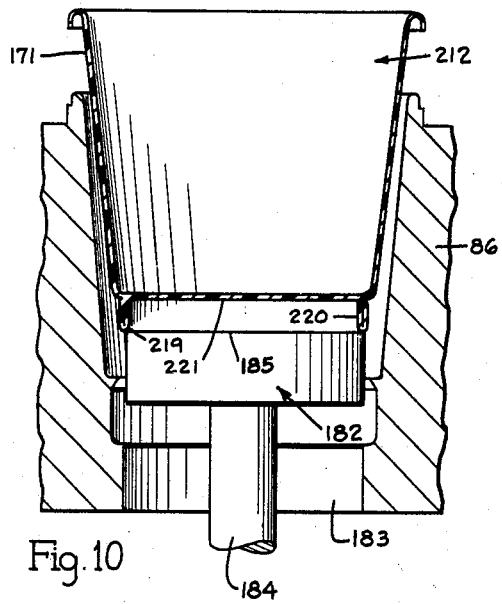

The finally formed false bottom container 212 is depicted in FIG. 10 as it is being removed from the mold and has a double thickness skirt portion 220 and a spaced bottom surface 221 which is spaced from the edge 219 of the skirt or depending portion 220.

*Operation*

The motor 34 is energized causing movement of the thermoplastic web 138 into the machine. Shaft 38 is rotated to cause cams 40, 62, 196 and 167 to rotate therewith to cause actuation of the parts in a sequential operation as shall now be described. (For purposes of ease of understanding, the semidiagrammatic view of FIG. 14 will be used in this discussion.) The cams 40 cause posts 44 to move the upper mandrel 84 in a downwardly direction and the cams 62 cause plate 72 to move upwardly which in turn causes the mold cavity 86 and plug 182 to move upwardly.

As the shaft 38 rotates, the mandrel means 84 and the mold cavity 86 are brought towards each other in a manner to first cause the under clamping means 204 to engage the material 138 to clamp it relative to clamping plate 90 to form an intermediate clamping arrangement. Thereafter the mandrel 84 engages the material 13 until the mechanical draw is completed and the ring 158 of the mandrel means and edge 202 thereon engage and clampingly hold the material 138 against portions 174 and 198 as shown in FIG. 6.

At this time cam 167 has rotated into engagement with valve 165 to open passageway 164 to the air pressure supply means 166 to afford a pressure differential to the membrane 138 through inlet 163 and outlets 161 of portion 160 of the mandrel. As shown in FIG. 7, a positive pressure shown by the directional arrows, causes separation of the heated thermoplastic material from the mandrel 84, and engagement of the material 138 with the side walls of the mold cavity to take a complementary configuration thereto. Immediately after the material 138 assumes the position shown in FIG. 7 and while the pressure differential still is in existence, cam member 196 actuates movable plate 188 causing plug 182 to move relative to cavity 86 from its position shown in FIG. 7 to the position shown in FIG. 8. It is to be emphasized that the timing of this movement of the plug 182 must occur very shortly after the operation shown in FIG. 7 and preferably is less than a tenth of a second thereafter. The relative diameter of the plug 182 and the second portion 173 of the side walls is such that it causes the material on the bottom half of the side wall second portion 173 to fold back and adhere to itself. As the plug 182 moves relative to the portion 173 of the mold, the preformed container walls 216 peel off the side walls rather than losing their identity such as would occur in a pressure or injection molding type of action. It is thought that this occurs because the side walls 173 are relatively cool which causes an almost instantaneous partial setting of the preformed container wall portion 216, so as to allow the walls to retain an identity until they are in the position shown in FIG. 8 whereupon the inner surfaces more or less flow together.

The top surface of the combination knock-out plug and forming member 182 is brought into substantial alignment with the reversed taper portion 180 of the shoulder means 170 to cause the marginal edges of the material forming the preformed container portion 218 to adhere to the side walls adjacent the tapered portion 180. Thus the bottom portion of walls 216 and bottom portion 218 of the preformed container 214 are moved to their final position and held there by the adherence to the side walls in a position adjacent the shoulder means 170, there being a tight seal completely around the margin of the bottom portion 218 in its final form.

To allow quick retraction of the combination knock-out plug and forming member 182 to its original position at the bottom of the mold 186 while allowing the bottom portion of the container and the double thickness of the side wall skirt portion to remain in a position shown in FIG. 8, the knockout plug is permeable so that it may be retracted without creating a vacuum immediately adjacent the bottom wall 218 of the formed container. As mentioned earlier in the specification, a small insert of a permeable character in the plug 182 is sufficient to prevent a vacuum from forming adjacent the material and the plug when removing same, and it is not necessary to cause a positive pressure in this area to efficaciously move the knocked-out plug 182 back to its spaced relation or position at the bottom of the mold. As aforementioned, at the same time that the plug 182 is being raised to its second position adjacent the shoulder 170, the air pressure differential created by the cam 167 remains in effect. The air pressure does two things, namely, provides a resilient bias so as to cause the bottom portion 218 of the container to be formed in a straight manner and secondly helps to chill the warm thermoplastic material so it will retain its formed state.

While the knock-out and forming plug 182 is being retracted, the air pressure is released and the combination cut off, clamping and mandrel member is moved downwardly to its third position to shear the formed container from the remaining scrap material 140 as shown in FIG. 9. The release of the air pressure and the chilling action of the mold cavity on the thermoplastic material causes the container 212 to shrink rather uniformly throughout its extent (except where held at the top of the cavity) so as to move the side walls of the skirt portion 220 inwardly a predetermined dimension and sufficiently to be clear of the shoulder means 170 (as shown in FIG. 9). Thus, after a short time delay, and after the mandrel 84 is moved up to its original position by cams 40, when cams 62 move the plate 72 and cavity 86 downwardly relative to the plug 182 (which bottoms on plate 183 and fixed frame 69), the top surface 194 of the plug 182 engages the double thickness skirt portion 220 to eject the formed container 212 from the mold, whereupon the formed container 212 is moved for packaging by the air jets 146 as mentioned hereinbefore. While the formed container 212 is being ejected from the cavity 86 and blown away by the jets 146, the material 138 is simultaneously moved into position for the new cycle to begin.

The time cycle of the operation above described when applied to cups is approximately two seconds, broken down as follows:

(It should be noted that this is an example only, as the cycle will be varied depending on the configuration and size of the container, this particular cycle pertains to thin wall containers such as seven ounce cups having a final wall thickness of five to ten thousandths of an inch.)

Approximately one third of the cycle time (two-thirds of a second) is required for the simultaneous happening of the movement of the fresh web stock 138 into position for engagement with the underside of the clamping means 90 and the ejection of the formed container 212 from the mold cavity 86 by the plug 182 when the cavity 86 is moved downwardly relative to the plug. Approximately one third of the time (two-thirds of a second) is required for the simultaneous movement of the cavity 86 upward and the mandrel means 84 downward to clamp the material 138 and mechanically draw same to the position shown in FIG. 6. The other or remaining one third of the time cycle accomplishes the three stages shown in FIGS. 7, 8 and 9. However, of this last one third of the cycle (two-thirds of a second), by far the greatest portion of the time is utilized in the cutoff of the rim of the formed container and the retraction of the mandrel 84 toward its starting position to afford clearance for the ejection of the formed container 212. Stated another way, only a very small fraction of this two-thirds of a second is required to preform the container 214 by the opening of valve 165 and the movement of the plug 182 from the bottom of the cavity to its position adjacent the shoulder means 170 and its return to the bottom of the cavity 86 and the release of the valve 165 to release the pressure differential.

An alternate method of actuating the combination knock-out and forming plug 182 relative to the mold cavity 86 for moving the container bottom portions in the final forming stage, is shown in FIG. 14a where in like parts have been denominated with primed numerals. Only the operation of the plug 182 has been schematically presented, it being understood that the other operations are accomplished substantially as shown in FIG. 14 and FIGS. 1 thru 4 of the drawings aforementioned. As shown in FIG. 14a the air supply 166' has a similar valve means 165' which allows an air pressure to be presented to the mandrel 84' through outlet 163'. On the downstream side of outlet 163' is suitable passageway means including flexible tubing 222 which is attached to an outlet 223 for actuating an air cylinder 224. No timing device is needed to cause the air cylinder 224 to actuate subsequent to the movement of the air pressure around mandrel 84' to form the material as shown in FIG. 7 since the time differential imposed by the time it takes for the pressure front to reach the second outlet downstream from the first outlet 163' makes certain that the combination knockout and forming plug 182' moves up to form the bottom portion of the false bottom container subsequent to engagement of the thermoplastic material to the confines of the mold 86. It will also be apparent that the time differential is very short. Another way (not shown) to accomplish the same result is to have two air lines at a Y-connection downstream of the valve means 165, one line going to the outlet 163' and the second line going to the actuator 224. The second line should be slightly longer than the first air line and in actual test it has been found that a differential in length of only two inches gives the desired short interval between the two operations.

Figures 15, 16:
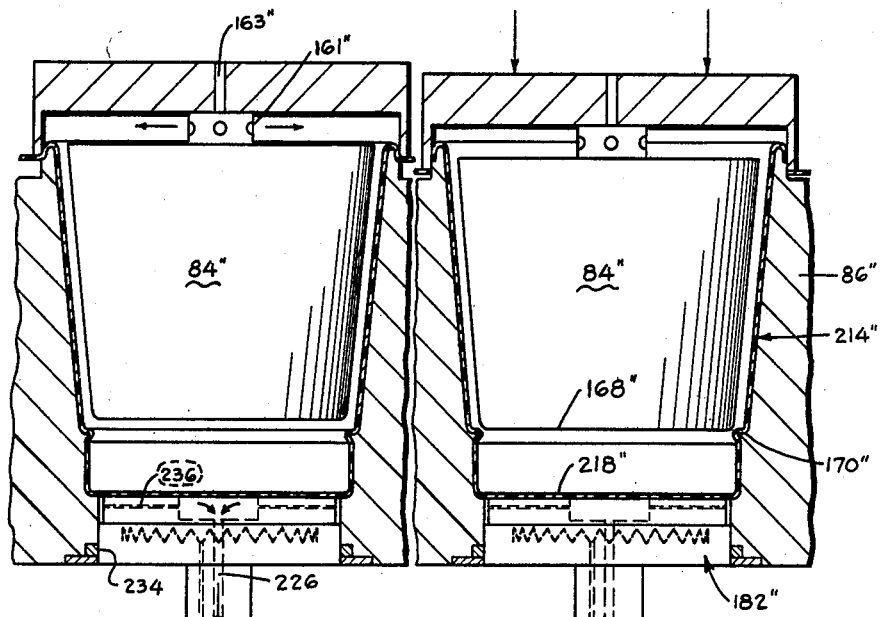
FIGS. 15 through 17 are views similar to FIGS. 7 through 9 showing an alternative method of making a false bottom container.
Figure 17:
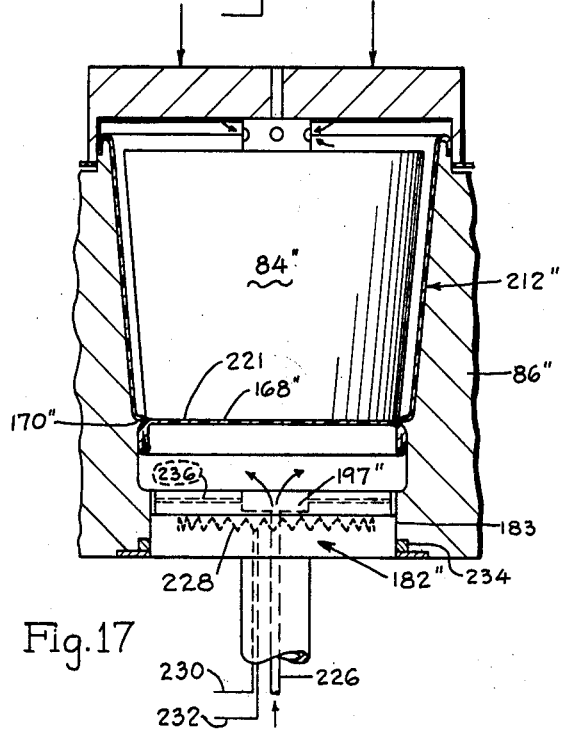

Another alternate embodiment of the invention as shown in FIGS. 15 thru 17 is portrayed with similar parts identified by the same reference numbers double primed. In this latter embodiment, the knock-out plug 182" does not physically move the material in the forming operation as discussed heretofore in the other embodiments. Rather, plug 182" has an insert 197" of sintered metal which serves as an outlet for a second source of fluid pressure attached to source 166" which is communicated through a supply pipe 226 which is formed in plug 182". Thus the fluid pressure causes the movement of the bottom 218" of the preformed container while plug 182" remains stationary. A heater 228 is preferably formed directly into the knock-out plug 182" (as discussed with the earlier embodiments but not shown), having suitable leads 230 and 232 extending therefrom. The plug 182" is preferably sealed relative to the mold portion 183" by suitable means 234. Also venting means 236 is provided for egress of trapped air during the preforming stage.

In this embodiment separate valving must be used for pipe 226 since the air pressure utilized in preforming the container through outlets 161" associated with mandrel 84" as shown in FIG. 15 must be released prior to forming a positive pressure through supply pipe 226 in the plug 182". As shown, the supply pipe 226 may help create the pressure differential used in preforming as shown in FIG. 15 by evacuation, or may be used to create the pressure differential alone by creating a vacuum on the underside of the mechanically drawn container, thereby drawing the material into the position shown in FIG. 15. In this latter event the outlets 161" and supply pipe 163 may be eliminated.

As shown in FIG. 16, the bottom 168" of the mandrel 84" also serves the function of providing an abutment means or stop upon which the bottom portion 218" of the preformed container 214" impinges when a positive pressure is introduced through supply pipe 226 to thus allow the bottom 221" of the finally formed container 212" to obtain a regular flat surface. It is necessary in this embodiment to vary the sequential operation by causing the cutoff step to be prior to the movement of the preformed container bottom portions 218, the remainder of the container being held in engagement in fixed position around the periphery at the lip of the container by the combination cutoff and clamping means. Thus, in this embodiment, the mandrel 84" first mechanically draws the material, then it is molded to the preformed state by the air pressure differential created either by outlets 226, or 161 or both, then the mandrel 84" is moved downwardly just adjacent the shoulder means 170" in the mold cavity the bottom surface 168" thereof to serve as a mold member when a reversed pressure differential is placed on the material as shown in FIG. 17. The shoulder means 170" in the mold cavity prevents the material from flowing up the sides intermediate the mandrel 84″ and the mold cavity and thus a false bottom container 212″ is formed having the characteristics aforementioned. Then, as before, the mandrel 84″ is removed upwardly and the container 212″ is allowed to shrink sufficiently so that when the mold is moved downwardly relative to the plug 182″ the container is ejected as before.

From the foregoing description it will be apparent that the machine is well adapted to mass manufacturing techniques, and that by the methods employed, a container of superior characteristics with a false or concaved bottom characteristic is produced.

Although specific embodiments have been shown and described, it is with full awareness that many modifications thereof are possible. The invention, is not to be restricted except insofar as is necessitated by the prior art and by the spirit of the appended claims.

This application is a division of my prior application 840,604 filed September 17, 1959, and now Patent 3,059,810 granted October 23, 1962.

I claim:

1. Apparatus for forming a thin wall false bottom container from thin heated thermoplastic material, comprising, mandrel means for mechanically drawing the thermoplastic material, mold means cooperable with said mandrel means and said thermoplastic material, means for introducing fluid pressure to one side of the thermoplastic material to cause separation from the mandrel means and engagement with mold means to preform a container having side walls, a bottom portion, and an open end portion, and means associated with said mold means for quickly moving the bottom portion of the preformed container toward the open end thereof so that a portion of the side walls fold back upon and adhere to themselves to thereby form a thin wall false bottom container.

2. Apparatus for forming a thin wall false bottom container from thin heated thermoplastic material, comprising, mandrel means for mechanically drawing the thermoplastic material, mold means having a longitudinally recessed first portion and a relatively movable end portion cooperable with said mandrel means and said thermoplastic material, means for introducing fluid pressure to one side of the thermoplastic material to cause separation from the mandrel means and engagement with said first and end portions of said mold means to preform a container having side walls, a bottom portion, and an open end portion, and means associated with said end portion of said mold means for quickly moving the bottom portion of the preformed container toward the open end thereof so that a portion of the side walls fold back upon and adhere to themselves to thereby form a thin wall false bottom container.

3. Apparatus for forming a thin wall false bottom container from thin heated thermoplastic material, comprising, heated mandrel means for mechanically drawing the thermoplastic material, mold means having a relatively cool side wall portion defining a cavity and a relatively heated end portion cooperable with said mandrel means and said thermoplastic material, means for introducing fluid pressure to one side of the thermoplastic material to cause separation from the mandrel means and engagement with side wall and end wall portions of the mold means to preform a container having side walls, a bottom portion, and an open end portion, and means for quickly moving the bottom portion of the preformed container in engagement with the heated end portion of the mold means and a portion of the side walls adjacent thereto toward the open end thereof so that said portion of the side walls fold back upon and adhere to themselves to thereby form a thin wall false bottom container.

4. Apparatus for forming an integral thin wall false bottom container from thin heated thermoplastic material, comprising mandrel means for mechanically drawing the thermoplastic material, mold means having a side wall portion and a relatively movable end portion having first and second positions relative to said side wall portion, said side wall portion being characterized by shoulder means positioned thereon in a manner to be adjacent said end portion when the latter is in its second position and to be spaced therefrom when said end portion is in its first position, said mold means being cooperable with said mandrel means and said thermoplastic material, means for introducing fluid pressure to one side of the thermoplastic material to cause separation from the mandrel means and engagement with the side wall and end portion of the mold means to preform a container having side walls, a bottom portion, and an open end portion, and means associated with said end portion of the mold means for quickly moving the bottom portion of the preformed container toward the open end thereof and into alignment with said shoulder means so that a portion of the side walls fold back upon and adhere to themselves to thereby fixedly position said bottom portion of the container adjacent said shoulder means to form a thin wall false bottom container.

5. Apparatus for forming a thin wall false bottom container from thin heated thermoplastic material, comprising mold means cooperable with said thermoplastic material, means for introducing fluid pressure to one side of the thermoplastic material to cause engagement with said mold means to preform a container having side walls, a bottom portion, and an open end portion, and means for quickly moving the bottom portion of the preformed container and a small portion of the side walls toward the open end thereof so that said small portion of the side walls fold back upon and adhere to themselves to thereby form a thin wall false bottom container.

6. Apparatus for forming a thin wall false bottom container from thin heated thermoplastic material, comprising, mandrel means for mechanically drawing the thermoplastic material, mold means cooperable with said mandrel means and said thermoplastic material and having first and second relatively movable portions, means for introducing fluid pressure to one side of the thermoplastic material to cause separation from the mandrel means and engagement with the first and second portions of the mold means to preform a container having side walls, a bottom portion, and an open end portion, and means associated with said mold means for quickly moving the second portion of the mold means relative to the first portion to engage the bottom portion of the preformed container and move the bottom portion toward the open end thereof and to a predetermined position so that a portion of the side walls fold back upon and adhere to themselves to thereby form a thin wall false bottom container.

7. Apparatus for forming a thin wall false bottom container from thin heated thermoplastic material, comprising mandrel means for mechanically drawing the thermoplastic material, mold means cooperable with said mandrel means and said thermoplastic material and having first and second relatively movable portions, fluid pressure means including supply means, passageway means, first outlet means to said passageway means and second outlet means in said passageway means spaced from and downstream of said first outlet means, said first outlet means being associated with said mandrel means for introducing fluid pressure to one side of the thermoplastic material to cause separation thereof from the mandrel means and engagement with the first and second portions of the mold means to preform a container having side walls, a bottom portion, and an open end portion, and said second outlet means being associated with said mold means for actuating the moving of the second portion of the mold means relative to the first portion to in turn engage the bottom portion of the preformed container and move the bottom portion toward the open end thereof and to a predetermined position so that a portion of the side walls fold back upon and adhere to themselves, the time differential of separation of the thermoplastic material from the mandrel means for engagement with the mold means and actuation of the second portion of the mold means being a function of the time required for the pressure of the supply means to be received at the second outlet means less the time it is received at the first outlet means upstream thereof.

8. Apparatus for forming a thin wall false bottom container from thin heated thermoplastic material, comprising, heated mandrel means for mechanically drawing the thermoplastic material, mold means having a relatively cool side wall portion defining cavity and relatively heated end portion cooperable with said mandrel means and said thermoplastic material, means for introducing a first fluid pressure differential to the thermoplastic material to cause separation from the mandrel means and engagement with side wall and end wall portions of mold means to preform a container having side walls, a bottom portion, and an open end portion, and means associated with said end portion for introducing a second fluid differential for quickly moving the bottom portion of the preformed container positioned in engagement with the heated end portion of the mold means and a portion of the side walls adjacent thereto toward the open end thereof and to a second position so that said portion of the side walls fold back upon and adhere to themselves to thereby form a thin wall false bottom container.

9. Apparatus for forming an integral thin wall false bottom container from thin heated thermoplastic material, comprising heated mandrel means for mechanically drawing the thermoplastic material, mold means having a side wall portion containing cooling means and a relatively movable end portion having first and second positions relative to said side wall portion, said end portion being characterized by having heating means therewithin and fluid pressure outlet means associated therewith, said side wall portion being characterized by shoulder means positioned thereon in a manner to be adjacent said end portion when the latter is in its second position and to be spaced therefrom when said end portion is in its first position, said mold means being cooperable with said mandrel means and said thermoplastic material, means associated with said mandrel means for introducing fluid pressure to one side of the thermoplastic material to cause separation from the mandrel means and engagement with the side wall and end portions of the mold means to preform a container having side walls, a bottom portion, and an open end portion, and means for supplying fluid pressure to said outlet means associated with said end portion of the mold means when said end portion is in its first position to quickly move the bottom portion of the preformed container toward the open end thereof and into alignment with said shoulder means so that a portion of the side walls fold back upon and adhere to themselves to thereby fixedly position said bottom portion of the container adjacent said shoulder means to form a thin wall false bottom container, and means causing relative movement of said side wall and end portions to position said end portion in its second position to afford ejection of the false bottom container from the mold means.

10. Apparatus for forming a thin wall false bottom container from thin heated thermoplastic material, comprising mandrel means for mechanically drawing the thermoplastic material, said mandrel means being characterized by side walls of generally frusto-conical shape, mold means cooperable with said mandrel means and said thermoplastic material and being characterized by side walls defining a cavity of generally frusto-conical shape and a relatively movable end portion, said side walls being characterized by a first portion, a second portion and a shoulder portion joining said first and second portions, said end portion of the mold means having a diameter less than the diameter of said second portion of the side walls and telescopingly relatively movable therewithin, said shoulder portion having a diameter greater than said end portion and less than said first and second portions of the side walls of the mold means, said second portion of the side walls having a diameter less than said first portion of the side walls, for introducing fluid pressure differential to the thermoplastic material to cause engagement of the material with the side walls and end portion of the mold means to perform a complementary shaped container having side walls, a bottom portion, and an open end portion, and means associated with said end portion of the mold means for quickly moving the bottom portion of the preformed container in contact with the end portion of the mold means and a portion of the side walls of the container in contact with a portion of the second portion of the side walls toward the open end of the container so that a portion of the side walls fold back upon and adhere to themselves and the bottom portion of the container is aligned with and marginally adheres to the side walls of the container adjacent the shoulder in the side walls of the mold means to thereby form a thin wall false bottom container.

11. Apparatus for forming a double thickness container portion on a sheet formed plastic container comprising:
(a) container mold means having a folding means portion operable to fold sheet plastic material without substantial stretching thereof and a fixed portion,
(b) means for disposing heated thin sheet plastic material in proximity to said folding means portion and fixed portion of said mold means,
(c) means chilling said mold means to a temperature substantially below the temperature of said heated material,
(d) means stretching said plastic material and causing same to engage said chilled mold means including said folding means portion in a preform shape of predetermined thickness, and
(e) means actuating said folding means portion of said mold means immediately subsequential to the engagement of the plastic material with said chilled mold means and prior to removal of a substantial portion of the heat from the preformed container, to cause portions of the preformed container to fold in a manner substantially without further stretching thereof and provide a double thickness container portion on a sheet formed container.

12. The apparatus set forth in claim 11 wherein the means stretching the material set forth in (d) and the means actuating the folding means portion of the container mold means set forth in (e) are fluid pressure means connected to a common source of supply, the outlet to the means set forth in (e) relative to the outlet for the means set forth in (d) being arranged so that fluid pressure emanating from the common source of supply reaches the means (d) just slightly prior to reaching the means (e).

13. The apparatus set forth in claim 11 wherein the container mold means fixed portion defines the open mouth portion of a container and the container mold means folding means portion defines the bottom wall of the container, the mold cavity outline defined by the fixed portion being of larger diameter than that defined by the folding means portion, the folding means portion being movable toward the open mouth portion of the container mold means the folding means portion of the mold means being initially disposed a first predetermined distance from the open mouth portion of the mold means during the initial stretching of the plastic material causing same to engage the chilled mold means to preform a container of a first height, the actuation of the folding means portion of the mold means to move same toward the open mouth portion causing the side walls of the preformed container to fold and reduce the overall height of the finished container as compared to its preform shape.

14. Apparatus for forming a thin wall container from thin heated thermoplastic sheet material comprising prestretch means for stretching the thermoplastic material to a first preform shape, chilled mold means having a temperature substantially below the temperature of said sheet material cooperable with said prestretch means and said thermoplastic material, said chilled mold means including a movable folding means portion, said movable folding means portion being operable to move and fold said thermoplastic material substantially without stretching thereof, pressure differential means for introducing a fluid pressure differential to said thermoplastic material to cause movement of the material from its preform shape into engagement with said chilled mold means including said folding means portion, and actuation means associated with said mold means for quickly moving the movable folding means portion subsequent to engagement of the material with said folding means portion to thereby fold the material without substantial stretching thereof and provide a double thickness portion on said thin wall container.

15. The apparatus set forth in claim 14 wherein said folding means portion of said molding means is further characterized as including means for ejecting said container from said chilled mold means subsequential to the formation of the double thickness portion on said thin wall container.

References Cited in the file of this patent

UNITED STATES PATENTS

| | | |
|---|---|---|
| 167,608 | Gill | Sept. 14, 1875 |
| 2,702,411 | Winstead | Feb. 22, 1955 |
| 2,784,455 | Pulaski | Mar. 12, 1957 |
| 2,891,280 | Politis | June 23, 1959 |
| 3,058,153 | Bush | Oct. 16, 1962 |

FOREIGN PATENTS

| | | |
|---|---|---|
| 1,263,451 | France | May 2, 1961 |